United States Patent
DeSalvo et al.

(10) Patent No.: US 7,376,702 B2
(45) Date of Patent: *May 20, 2008

(54) SYSTEM AND METHOD FOR PROCESSING MESSAGE ATTACHMENTS

(75) Inventors: Christopher Joseph DeSalvo, San Francisco, CA (US); Scott Kister, Woodside, CA (US)

(73) Assignee: Danger, Inc., Palo Alto, CA (US)

( * ) Notice: Subject to any disclaimer, the term of this patent is extended or adjusted under 35 U.S.C. 154(b) by 681 days.

This patent is subject to a terminal disclaimer.

(21) Appl. No.: 10/138,207

(22) Filed: May 2, 2002

(65) Prior Publication Data

US 2003/0208546 A1 Nov. 6, 2003

(51) Int. Cl.
*G06F 15/16* (2006.01)

(52) U.S. Cl. .................. 709/206; 707/102; 370/392

(58) Field of Classification Search ............... 709/206, 709/246, 203, 227, 217, 209; 370/392; 358/1.15
See application file for complete search history.

(56) References Cited

U.S. PATENT DOCUMENTS

| | | | |
|---|---|---|---|
| 5,764,899 A | 6/1998 | Eggleston et al. | |
| 5,781,901 A | 7/1998 | Kuzma et al. | |
| 5,818,447 A | 10/1998 | Wolf et al. | |
| 5,903,723 A | 5/1999 | Beck et al. | |
| 5,974,449 A | 10/1999 | Chang et al. | |
| 6,023,700 A | 2/2000 | Owens et al. | |
| 6,092,114 A | 7/2000 | Shaffer et al. | |
| 6,101,320 A | 8/2000 | Schuetze et al. | |
| 6,256,666 B1 * | 7/2001 | Singhal | 709/217 |
| 6,275,848 B1 * | 8/2001 | Arnold | 709/206 |
| 6,360,252 B1 * | 3/2002 | Rudy et al. | 709/206 |
| 6,505,237 B2 * | 1/2003 | Beyda et al. | 709/206 |
| 6,546,417 B1 * | 4/2003 | Baker | 709/206 |
| 6,598,076 B1 | 7/2003 | Chang et al. | |
| 6,839,741 B1 | 1/2005 | Tsai | |
| 2002/0016818 A1 * | 2/2002 | Kirani et al. | 709/203 |
| 2002/0019851 A1 | 2/2002 | Pollack | |
| 2002/0035576 A1 | 3/2002 | Kishimoto et al. | |
| 2002/0051181 A1 * | 5/2002 | Nishimura | 358/1.15 |

(Continued)

FOREIGN PATENT DOCUMENTS

KR WO 02/13031 A1 * 8/2001

OTHER PUBLICATIONS

Office Action for Related Case U.S. Appl. No. 09/952,419, filed Sep. 13, 2001; 13 pgs.

(Continued)

*Primary Examiner*—Dustin Nguyen
(74) *Attorney, Agent, or Firm*—Blakely, Sokoloff, Taylor & Zafman, LLP

(57) ABSTRACT

A method is described comprising: receiving an e-mail containing an original attachment at a data service, the e-mail addressed to a data processing device to which the data service is communicatively coupled, the data processing device having specified processing capabilities; converting the original attachment based on the specified processing capabilities to a format which the data processing device can process; receiving an e-mail response from the data processing device intended to include the original attachment; locating and reattaching the original attachment; and transmitting the e-mail message with the original attachment to its destination.

38 Claims, 3 Drawing Sheets

U.S. PATENT DOCUMENTS

| | | |
|---|---|---|
| 2002/0059384 A1 | 5/2002 | Kaars |
| 2002/0120693 A1* | 8/2002 | Rudd et al. .................. 709/206 |
| 2003/0028647 A1* | 2/2003 | Grosu ......................... 709/227 |
| 2003/0050933 A1* | 3/2003 | DeSalvo ...................... 707/102 |
| 2003/0065926 A1 | 4/2003 | Schultz et al. |
| 2003/0093565 A1* | 5/2003 | Berger et al. ................ 709/246 |
| 2003/0095550 A1* | 5/2003 | Lewis et al. ................. 370/392 |
| 2003/0126214 A1* | 7/2003 | Oliszewski .................. 709/206 |

OTHER PUBLICATIONS

Current claims for Related Case U.S. Appl. No. 09/952,419, filed Sep. 13, 2001; 5 pages.

Wilson, et al., (2000), From the techies . . . , pp. 1-3; Feb. 2000.

Christopher J. Desalvo, "A System and Method of Distributing a File by Email", U.S. Appl. No. 09/952,419, filed Sep. 13, 2001, Notice of Allowance mailed May, 24, 2006. Copy of Notice of Allowance, Examiner's reason for allowance and a copy of the claims as allowed.

* cited by examiner

SYSTEM AND METHOD FOR PROCESSING MESSAGE ATTACHMENTS

BACKGROUND OF THE INVENTION

1. Field of the Invention

This invention relates generally to the field of data processing systems. More particularly, the invention relates to an improved system and method for processing message attachments between a data service and a data processing device.

2. Description of the Related Art

E-mail has become an irreplaceable tool in today's business environment. Virtually all corporate employees rely on e-mail in one way or another to communicate both externally with customers and internally with other employees.

Current e-mail standards allow files to be "attached" and transmitted along with e-mail messages. The most common file attachment standard is the Multipurpose Internet Mail Extensions ("MIME") standard, which encodes files on the transmitting end (e.g., using binary-to-ASCII encoding) and subsequently decodes the files on the receiving end. A header is added to the files which includes an indication of the type of data contained in the files and the encoding method used. Secure MIME ("S/MIME") is a version of MIME that adds Rivest-Shamir-Adleman ("RSA") encryption for secure transmission.

If the client receiving the e-mail message has the proper software installed, once the attachments are decoded, they may be viewed, executed and/or edited by the message recipient. One problem which exists, however, is that not all clients are equipped with the software required to process all types of message attachments. For example, if an attachment is compressed using a particular compression tool (e.g., such as Winzip™), the message recipient will not be able to open the attachment unless he/she has the compression tool installed on his/her client computer. Similarly, if the attachment is in a particular document format (e.g., Adobe's Portable Document Format), the recipient will not be able to view or edit the attachment unless support for that format is installed on his/her client computer.

Attachments are particularly problematic for wireless and/or portable data processing devices which, quite frequently, do not support standard file formats and executables. Thus, while many wireless/portable devices are capable of connecting to the Internet to download e-mail messages, the message attachments may be unusable.

Accordingly, what is needed is an improved system and method for intelligently processing e-mail message attachments. What is also needed is a system and method which will work without the need for additional software on the receiving client computer or wireless/portable data processing device.

SUMMARY

A method is described comprising: receiving an e-mail containing an original attachment at a data service, the e-mail addressed to a data processing device to which the data service is communicatively coupled, the data processing device having specified processing capabilities; converting the original attachment based on the specified processing capabilities to a format which the data processing device can process; receiving an e-mail response from the data processing device intended to include the original attachment; locating and reattaching the original attachment; and transmitting the e-mail message with the original attachment to its destination.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for coordinating between a plurality of e-mail accounts. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
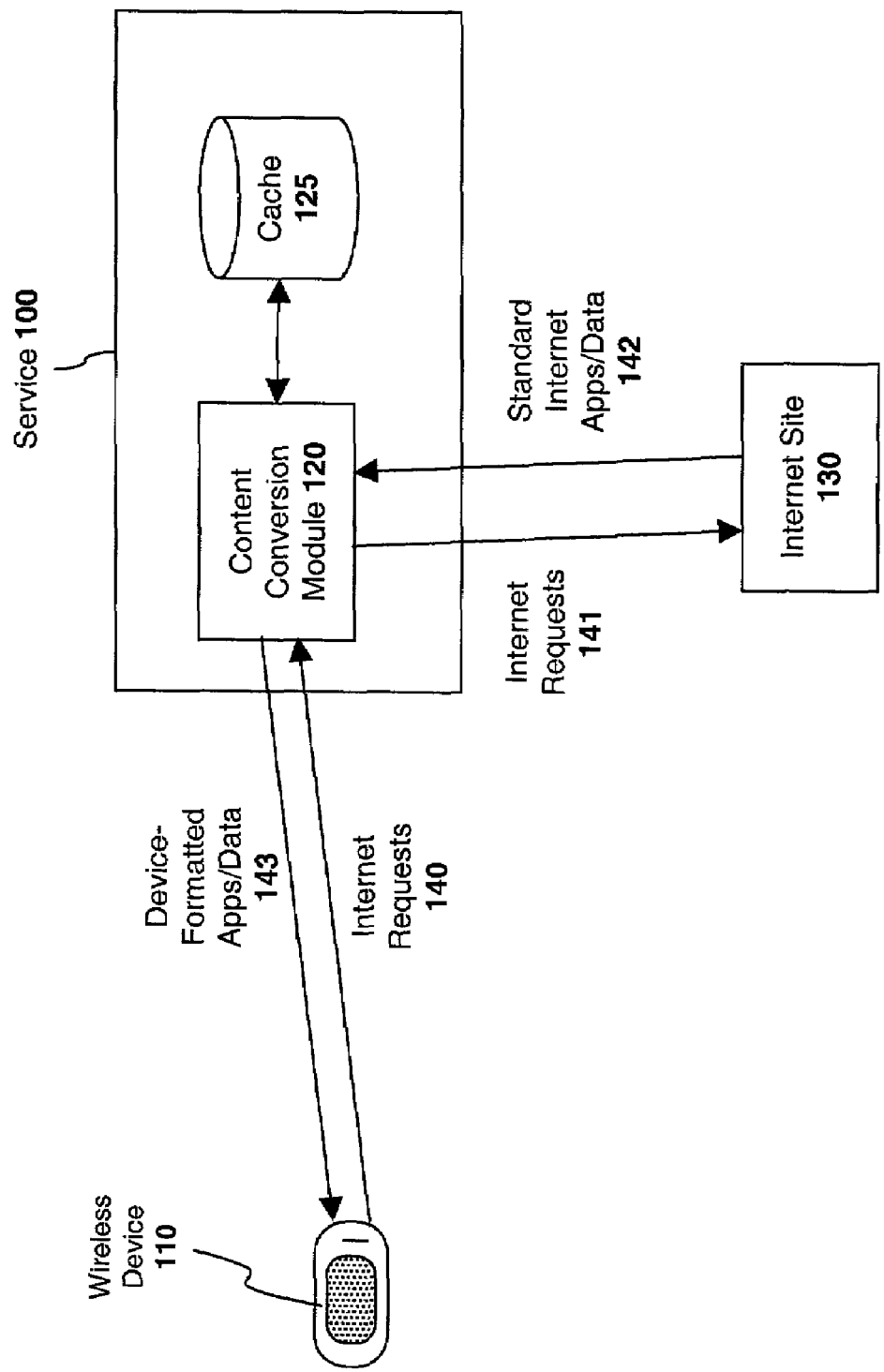
FIG. 1 illustrates one embodiment of a data processing service communicating with a data processing device.

Embodiments of the invention may be implemented on a data processing service 100 such as that illustrated generally in FIG. 1. The service 100, which may be comprised of one or more servers, provides a portal through which data processing devices 110 may access content (e.g., Web pages, multimedia content, e-mail, . . . etc) from external Internet sites 130. Embodiments of such a service 100 are described in co-pending application entitled NETWORK PORTAL SYSTEM, APPARATUS AND METHOD, Ser. No. 09/714, 897, now U.S. Pat. No. 6,721,804, Filed Nov. 15, 2000 (hereinafter "Network Portal Application"), which is assigned to the assignee of the present application and which is incorporated herein by reference. Certain features of the service 100 will now be described followed by a detailed description of a system and method for processing message attachments.

In one embodiment, the service 100 converts standard applications and data into a format which each wireless data processing device 110 can properly interpret. Thus, as illustrated in FIG. 1, one embodiment of the service 110 includes a content conversion module 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 124 into a format which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the portal device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a low power microprocessor or microcontroller, thereby lowering the cost of manufacture and/or the energy consumed by the device 110.

In one embodiment, when a particular Web page or other Internet object has been converted into a format suitable for execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Various caching techniques and algorithms may be implemented to ensure that the cache 125 is storing Internet data efficiently (i.e., resulting in an acceptable percentage of cache 'hits') and that the data is current. For example, the service 100 may cache the most frequently-requested Internet data (e.g., the Yahoo™ home page), and may remove content from the cache based on a least-recently used caching policy. In addition, to ensure that data stored in the cache is current, the service 100 may compare the version of the data stored in the cache 125 with the version of data stored at the remote Internet site 130 when the data is requested. Similarly, the service 100 may store data in the cache 125 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

Message Attachment Processing

Figure 2:
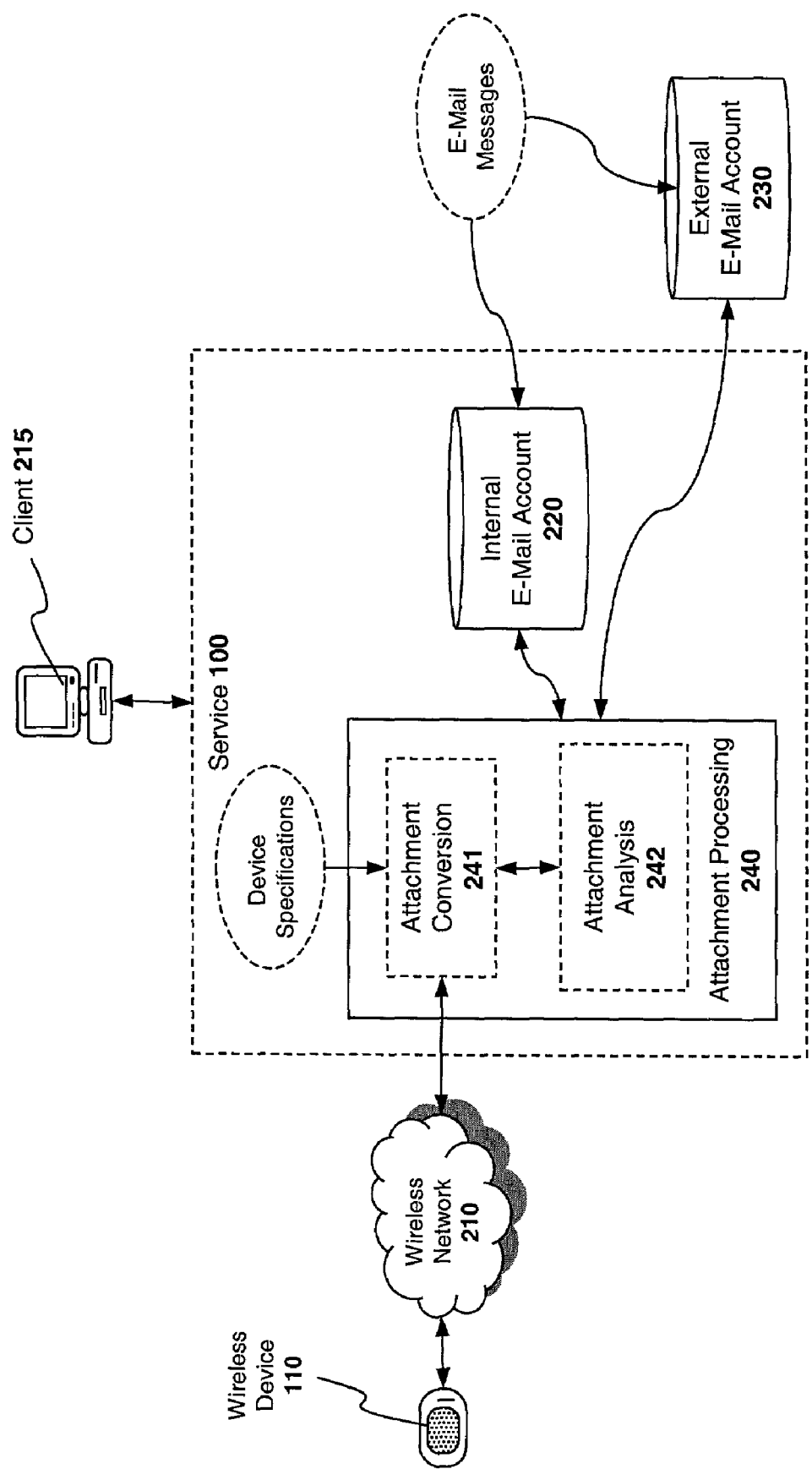
FIG. 2 illustrates attachment processing logic according to one embodiment of the invention.

One embodiment of the service 100, illustrated in FIG. 2, is comprised of an attachment processing module 240 for processing e-mail attachments transmitted to and from the wireless device 110. The attachment processing module 240 is itself comprised of an attachment conversion module 241 for converting e-mail attachments based on the wireless device specifications (e.g., processing capabilities, screen resolution, . . . etc), and an attachment analysis module 242 for identifying attachment types and maintaining a link between attachments sent to the wireless device 110 and original attachments stored on the user's e-mail account. Thus, the attachment conversion module 241 operates in a similar manner to the content conversion module 120 described above except that it specifically converts e-mail attachments for rendering on the wireless device 110.

In one embodiment, the attachment processing techniques described herein may be applied to both internal e-mail accounts 220 (i.e., internal in the sense that they are maintained by the service 100) and external e-mail accounts 230 (e.g., accounts provided by Internet Service Providers or Web portals such as Yahoo™). In addition, while embodiments of the invention are described herein with respect to a wireless device 110 communicating over a wireless network 210, it should be noted that many of these embodiments may be employed for a non-wireless client 215 communicating over a standard, wired network.

Figure 3:
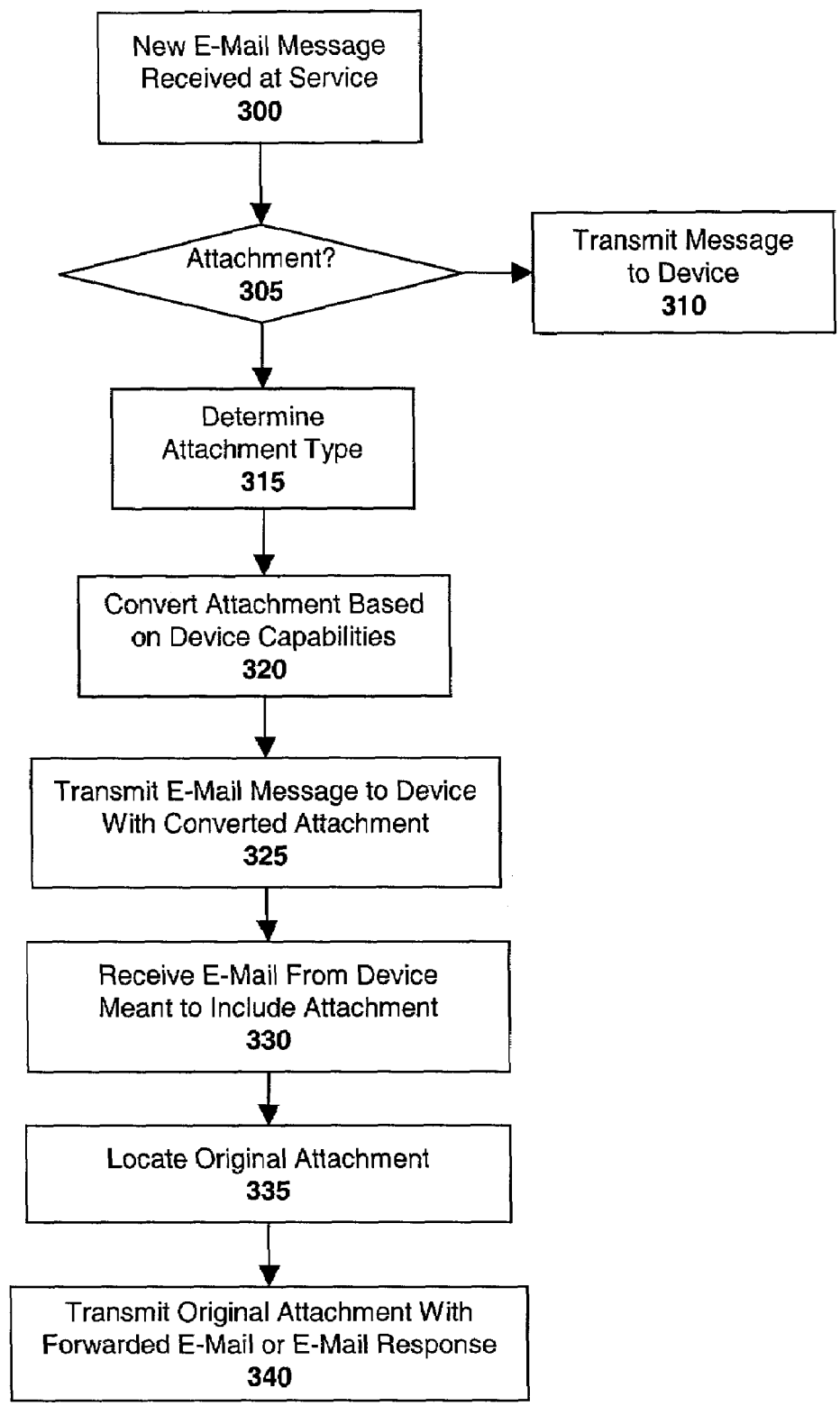
FIG. 3 illustrates an attachment processing method according to one embodiment of the invention.

FIG. 3 illustrates one embodiment method which may be employed by the system illustrated in FIG. 2. At 300, when a new e-mail message is initially received at one of the user's e-mail accounts 220, 230 the attachment processing module 240 determines whether the e-mail includes an attachment. In one embodiment, the attachment analysis module 242 makes this determination by searching the e-mail message for an attachment header or for some other indication that the message contains an attachment such as a stream of unidentified bytes (e.g., an "octet-stream").

If the message does not contain an attachment then, at 310, the service transmits the message to the wireless device 110. Prior to transmission, the service 100 may also convert the e-mail message so that the message may be properly rendered by the wireless device 110. For example, if the e-mail message body is in an HTML format, and the wireless device 110 cannot interpret HTML, the service 100 will convert the HTML content into a format which is interpretable by the device (e.g., as described above with respect to FIG. 1).

If the e-mail message contains an attachment then, at 315, the attachment analysis module 242 attempts to determine the attachment type. Virtually any type of file may be attached to an e-mail message including, by way of example but not limitation, a file compressed or otherwise encoded/encrypted (hereinafter "encoded") using a specified encoding algorithm (e.g., Winzip); a file formatted according to a particular word processing program (e.g., Microsoft Word); and an encoded and/or compressed image (e.g., a JPEG image) which may only be properly displayed using a particular minimum color depth and resolution. In one embodiment, the attachment analysis module will identify the attachment type directly from the attachment header.

Sometimes, however, the attachment may not be identified in the header. Rather, it may be delivered as a stream of bytes (an octet stream) with no indication of file type. In this case, the attachment analysis module 242 may perform a more in-depth analysis on the file. For example, in one embodiment, the attachment analysis module 242 may use portions of the file name such as the filename extension (e.g., ".doc" for Microsoft Word documents; ".jpg" for JPEG images, . . . etc) to attempt to identify the file type. In addition, in one embodiment, the attachment analysis module 242 examines the underlying data in the attachment for well known headers. For example, GIF images always start with "GIF87" or "GIF89a." Similarly, JPEG images start with the bytes "FF D8."

The attachment analysis module 242 may also query the user as to the file type (e.g., asking the user to link the file to a particular type of application). Various other attachment identification techniques may be employed while still complying with the underlying principles of the invention.

Once the attachment file type is identified, at 320, the attachment conversion module 241 checks to see if a known mechanism exists (e.g., rules, instructions, program code, . . . etc) for converting this type of attachment into a format which the wireless device 110 can process. If it does, it converts the attachment and, at 325, transmits the converted version of the attachment along with the e-mail message to the wireless device 110.

If the attachment conversion module 241 cannot identify the attachment or a conversion mechanism for the attachment, in one embodiment, it may simply refrain from transmitting the attachment to the wireless device 110. It may, however, notify the user that the original message contained an attachment and may include the attachment name within the e-mail message. The attachment conversion module 241 may subsequently transmit the unprocessed attachment to the wireless device in response to a request from the user. The user may then manually attempt to access/process the attachment.

Various types of conversion may be employed by the attachment conversion module 241. For example, if the attachment is a JPEG image, the conversion module 241 may shrink the JPEG image to fit on the wireless device's screen and/or may change the color depth of the image (e.g., it may convert the image to grayscale). Similarly, if the attachment is a Word file, the conversion module 241 may convert the content of the Word file into to a format viewable on the wireless device's screen. If the attachment is a compressed and/or encoded file (e.g., compressed/encoded using Winzip) the conversion module 241 may initially decompress/decode the file to extract the files embedded within the compressed/encoded file. If it can identify the embedded files it may then convert the embedded files as described above, before transmitting the embedded files to the wireless device 110.

A virtually unlimited number of file types may be converted by the attachment processing module 240 for rendering on the wireless device 110 including, but not limited to, Portable Network Graphics ("PNG") files, Graphics Interchange Format ("GIF") files, Portable Document Format ("PDF") files, Hypertext Markup Language ("HTML") files with different levels of embedded content. Moreover, various additional encoding types may be processed (i.e., decoded and/or re-encoded) including, but not limited to, uuencoding, base64 encoding, and binhex encoding.

Once the e-mail message is received by the wireless device 110, the user may subsequently respond to the e-mail message while still retaining the email message history, including the attachment. In addition, the user may forward the e-mail to another user with the attachment. The user may also detach the attachment file and subsequently re-attach the attachment file to a new e-mail message addressed to another user. In each of these cases, one embodiment of the attachment processing module 240 will transmit the attachment in its original form to the destination address, rather than in its converted form (i.e., so that the message recipient may process the message attachment). However, in one embodiment, the attachment processing module 240 will initially determine whether the destination address is another wireless device capable of processing the converted attachment (e.g., a device of a user subscribed to the service 100). If so, the attachment processing module 240 will transmit the converted attachment, rather than the original attachment.

In one embodiment, when an e-mail containing an attachment is transmitted from the wireless device, instead of sending the converted attachment over the wireless network, only a reference to the attachment is transmitted (e.g., "include attachment #2"), thereby conserving a considerable amount of bandwidth. The reference is subsequently used by the attachment processing module 240 to locate the original attachment.

The original attachment may be identified and/or regenerated by the attachment processing module 240 in a variety of ways. For example, in one embodiment, the attachment processing module 240 maintains a link between attachments stored in the e-mail databases 220, 230 (i.e., the original attachments) and the converted attachments stored on the wireless device 110. The link may simply be a table containing attachment/message ID codes on the wireless device and corresponding e-mail database attachment/message ID codes. Upon receiving an e-mail from the wireless device 110 with a converted attachment, or with a reference to the attachment, the attachment processing module 240 may perform a lookup in the table using the message's and/or attachment's ID code to identify the corresponding original attachment.

In one embodiment, however, the attachment and/or e-mail message ID code does not change when the attachment is converted and transmitted to the wireless device 110. Accordingly, in this embodiment, no table lookup is required to identify the attachment within the e-mail databases 220, 230.

In another embodiment, the attachment conversion module 241 may regenerate the original attachment from the converted attachment. For example, in the case of a Microsoft Word file or other word processing document, the attachment conversion module 241 may reconstruct the format of the original file using text and other information from the converted file. In one embodiment, data may be embedded within the converted file indicating specifically how the Word file should be regenerated. Similarly, in the case of a compressed/encoded file, the attachment conversion module 241 may recompress/re-encode the embedded files. Various other techniques may be employed to link and/or regenerate converted attachments to standard attachments while still complying with the underlying principles of the invention.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, while embodiments of the invention are described above in the context of "attachments," certain principles of the invention may be employed using a variety of alternate e-mail message data. Accordingly, the scope and spirit of the invention should be judged in terms of the claims which follow.

What is claimed is:

1. A method comprising:
    receiving an e-mail containing an original attachment at a data service, said e-mail addressed to a data processing device to which said data service is communicatively coupled, said data processing device having specified processing capabilities;
    determining an original format of said original attachment by analyzing data within said original attachment, wherein the data within said original attachment comprises header data;
    storing said original attachment in said original format on said data service;
    if said original attachment is in a format that can be modified by said data service to a format which said data processing device can process, then:
        converting a copy of said original attachment based on said specified processing capabilities to a modified attachment in a format which said data processing device can process;
        generating linking information linking a modified attachment with said original attachment;
        storing said linking information in a table on said data service; and
        transmitting said e-mail with said modified attachment to said data processing device; and
    if said original attachment is not in a format that can be modified by said data service to a format which said data processing device can process, then:
        generating an attachment identifier;
        generating linking information linking said attachment identifier with said original attachment;
        storing said linking information in a table on said data service; and
        transmitting said e-mail with said attachment identifier to said data processing device;
    receiving an e-mail response from said data processing device intended to include said original attachment;
    locating said original attachment from said linking information and attaching said original attachment to said e-mail response; and
    transmitting said e-mail response with said original attachment to its destination.

2. The method as in claim 1 wherein determining comprises:
    searching in an attachment header of said e-mail to identify said original format.

3. The method as in claim 1 wherein determining comprises:
    analyzing said original attachment's file name to determine said original format.

4. The method as in claim 3 wherein analyzing comprises identifying said file name's extension.

5. The method as in claim 4 wherein said original attachment is a Microsoft Word document.

6. The method as in claim 4 wherein said original attachment is a JPEG image.

7. The method as in claim 1 wherein said original attachment is comprised of one or more encoded files and wherein converting comprises:
    decoding said one or more encoded files to produce one or mode decoded files; and
    converting said one or more decoded files based on said specified processing capabilities to a format which said data processing device can process if said data processing device cannot process said one or more decoded files.

8. The method as in claim 1 wherein said original attachment is an image file and wherein converting comprises converting said image file to a resolution and/or color depth which said data processing device can render.

9. The method as in claim 1 wherein said original attachment is a word processing file and wherein converting comprises converting said word processing file to text which said data processing device can display.

10. The method as in claim 1 wherein said original attachment is a file containing specific text formatting and images wherein converting comprises converting said specific text formatting and images into a format renderable by said data processing device.

11. The method as in claim 1 wherein said data processing device is a wireless data processing device.

12. A system comprising:
    an attachment analysis module to determine an original format of an original attachment in an e-mail addressed to a data processing device by analyzing the data within said original attachment, wherein said attachment analysis module searches in an attachment header of said e-mail to identify said original format;
    a data storage device to store the original attachment in the original format;
    if said original attachment is in a format that can be modified by said data service to a format which said data processing device can process, then:
        an attachment conversion module to convert a copy of said original attachment based on processing capabilities of said data processing device to a modified attachment in a format which said data processing device can process; and
        an attachment transmission module to transmit said e-mail with said modified attachment to said data processing device;
        said attachment analysis module to further generate linking information linking a modified attachment with said original attachment and to store said linking information in a table; and
    if said original attachment is not in a format that can be modified by said data service to a format which said data processing device can process, then:

an attachment identifier generation module to generate an attachment identifier; and an attachment transmission module to transmit said e-mail with said attachment identifier to said data processing device;

said attachment analysis module to further generate linking information linking said attachment identifier with said original attachment and to store said linking information in a table;

said attachment analysis module to further locate and attach said original attachment to an e-mail response in response to receiving said e-mail response from said data processing device intended to include said original attachment, wherein said linking information is used to locate said original attachment responsive to receiving said e-mail response.

13. The system as in claim 12 wherein said attachment analysis module analyzes said original attachment's file name to determine said original format.

14. The system as in claim 13 wherein said analysis comprises identifying said file name's extension.

15. The system as in claim 14 wherein said original attachment is a Microsoft Word document.

16. The system as in claim 14 wherein said original attachment is a JPEG image.

17. The system as in claim 12 wherein said attachment analysis module analyzes contents of data within said original attachment to determine said original format.

18. The system as in claim 12 wherein said original attachment is comprised of one or more encoded files and wherein converting comprises:

decoding said one or more encoded files to produce one or mode decoded files; and converting said one or more decoded files based on said specified processing capabilities to a format which said data processing device can process if said data processing device cannot process said one or more decoded files.

19. The system as in claim 12 wherein said original attachment is an image file and wherein converting comprises converting said image file to a resolution and/or color depth which said data processing device can render.

20. The system as in claim 12 wherein said original attachment is a word processing file and wherein converting comprises converting said word processing file to text which said data processing device can display.

21. The system as in claim 12 wherein said original attachment is a file containing specific text formatting and images and wherein said attachment conversion module converts said specific text formatting and images into a format renderable by said data processing device.

22. The system as in claim 12 wherein said data processing device is a wireless data processing device.

23. The system as in claim 12 wherein said linking information comprises a table containing a correspondence between converted attachment identification codes and original attachment identification codes.

24. A machine readable medium having program code stored thereon which, when executed by a machine, causes said machine to perform the operations of:

determining an original format of said original attachment by analyzing data within said original attachment, wherein the data within said original attachment comprises header data;

storing said original attachment in said original format on said data service;

if said original attachment is in a format that can be modified by said data service to a format which said data processing device can process, then:

converting a copy of said original attachment based on said specified processing capabilities to a modified attachment in a format which said data processing device can process;

generating linking information linking a modified attachment with said original attachment;

storing said linking information in a table on said data service; and transmitting said e-mail with said modified attachment to said data processing device; and if said original attachment is not in a format that can be modified by said data service to a format which said data processing device can process, then:

generating an attachment identifier;

generating linking information linking said attachment identifier with said original attachment;

storing said linking information in a table on said data service; and transmitting said e-mail with said attachment identifier to said data processing device;

receiving an e-mail response from said data processing device intended to include said original attachment;

locating said original attachment from said linking information and attaching said original attachment to said e-mail response; and transmitting said e-mail response with said original attachment to its destination.

25. The machine readable medium as in claim 24 wherein determining comprises:

searching in an attachment header of said e-mail to identify said original format.

26. The machine readable medium as in claim 24 wherein determining comprises:

analyzing said original attachment's file name to determine said original format.

27. The machine readable medium as in claim 24 wherein analyzing comprises identifying said file name's extension.

28. The machine readable medium as in claim 27 wherein said original attachment is a Microsoft Word document.

29. The machine readable medium as in claim 27 wherein said original attachment is a JPEG image.

30. The machine readable medium as in claim 24 wherein said original attachment is comprised of one or more encoded files and wherein converting comprises:

decoding said one or more encoded files to produce one or mode decoded files; and converting said one or more decoded files based on said specified processing capabilities to a format which said data processing device can process if said data processing device cannot process said one or more decoded files.

31. The machine readable medium as in claim 24 wherein said original attachment is an image file and wherein converting comprises converting said image file to a resolution and/or color depth which said data processing device can render.

32. The machine readable medium as in claim 24 wherein said original attachment is a word processing file and wherein converting comprises converting said word processing file to text which said data processing device can display.

33. The machine readable medium as in claim 24 wherein said attachment is a file containing specific text formatting and images and wherein converting comprises converting said specific text formatting and images into a format renderable by said data.

34. The machine readable medium as in claim 24 wherein said data processing device is a wireless data processing device.

35. The method as in claim 1 further comprising:
storing a copy of said modified attachment at said data service;
attaching said modified attachment to en e-mail sent from said data processing device destined for a data processing device of similarly limited data processing capability.

36. The method as in claim 1, wherein the linking information comprises attachment/message ID codes identifying attachments/message IDs on the data processing device and corresponding e-mail database attachment/message ID codes.

37. The system as in claim 12, wherein the linking information comprises attachment/message ID codes identifying attachments/message IDs on the data processing device and corresponding e-mail database attachment/message ID codes.

38. The machine-readable medium as in claim 24, wherein the linking information comprises attachment/message ID codes identifying attachments/message IDs on the data processing device and corresponding e-mail database attachment/message ID codes.

* * * * *